March 29, 1960 L. J. CULHANE 2,930,159
ROTATABLE FISHING SPREADER
Filed June 30, 1958
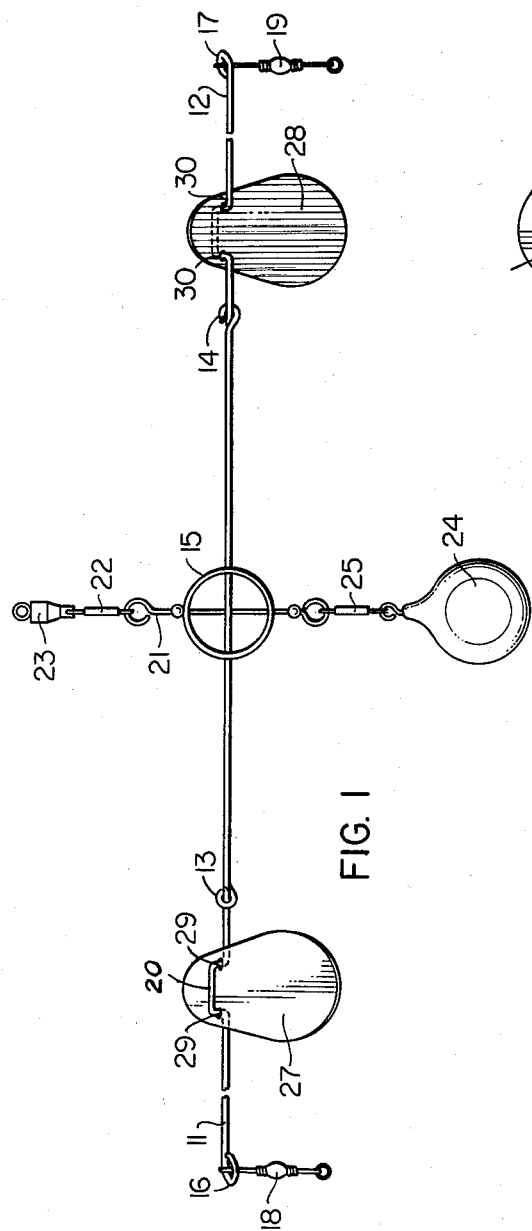
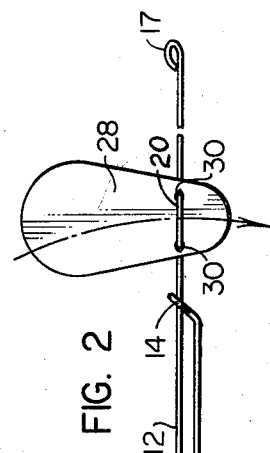
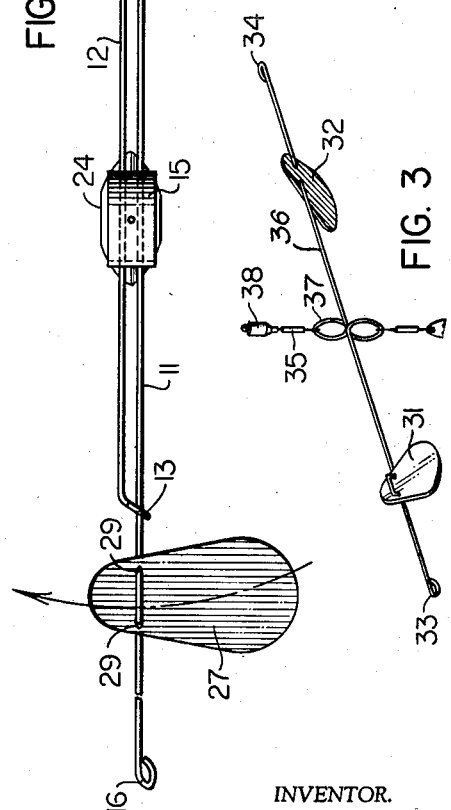
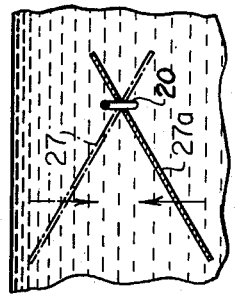
INVENTOR.
LEROY J. CULHANE
BY
ATTORNEYS

United States Patent Office 2,930,159
Patented Mar. 29, 1960

2,930,159

ROTATABLE FISHING SPREADER

Leroy J. Culhane, Cleveland Heights, Ohio, assignor of one-half to Stanley A. Fuller, Lyndhurst, Ohio Application June 30, 1958, Serial No. 745,540

5 Claims. (Cl. 43—42.74)

This invention relates to a device for use in fishing. More particularly, the invention relates to a spreader device of the type which permits attachment of more than one lure to a fishing line. The term "lure" as used herein is intended to include not only artificial lures but also natural lures such as live or dead minnows, worms, and similar baits which are commonly used in fishing.

Spreader devices are widely used in so-called "still fishing," that is, fishing from a pier or boat, or ice fishing in which the lure is moved primarily in a vertical direction. In still fishing, little or no movement can be imparted to the lure by the fisherman. As a result, many devices have been suggested for producing movement of the lures. For example, it has been suggested that a propeller-like member be attached to the spreader to produce rotation of the lures as the spreader is moved through the water. Although such devices produce rotation as the spreader is lowered in the water, the direction of rotation is suddenly reversed when the spreader is raised in the water rather than lowered. This continued reversal of rotation produces a movement of the lures which is substantially different from the life-like swimming movement desired.

In addition to the above shortcomings in the operation of these devices, many of them are extremely complicated in construction resulting in manufacturing difficulties and high cost.

The spreaders of the present invention, although simple in construction, overcome the difficulties encountered heretofore. The spreader rotates in the same direction whether the spreader is being raised or lowered in the water thereby producing life-like movement of the lures thereon. Moreover, the direction of rotation may be changed simply and easily without the use of any tools or special equipment.

An object of the invention is to provide a spreader which will rotate in the same direction irrespective of whether the spreader is being raised or lowered in the water, thereby imparting life-like swimming movement to lures attached thereto.

Another object is to provide a spreader which permits rotation in either direction.

Other objects and advantages of the invention will be apparent from the following detailed drawing and description in which:

Figure 1 is a side view of a spreader of the invention.
Figure 2 is a top view of the spreader.
Figure 3 is an isometric view of another form of spreader embodying the invention.
Figure 4 is a sectional view through one of the wings showing the position of the wing as the spreader is moved through the water.

A rotatable spreader of the present invention comprises a collapsible support or sweep having arms 11 and 12 held in position by a central member 15. For use, the support may be extended to its full length by pulling the arms 11 and 12 until their terminal loops 13 and 14 are drawn close to the central member 15 to frictionally lock the arms in extended position. At the opposite ends of the arms 11 and 12 are located loops 16 and 17 to which suitable lures or hooks may be affixed by means of lure supports 18 and 19.

Through the central member 15 is passed a wire 21 having a ring at each end. To the upper ring is attached a line using a snap 22 and a pivot 23 as the connecting link. To the lower ring is attached a sinker 24 through snap 25.

Wings 27 and 28 are preferably positioned on the arms 11 and 12 so that they will be equidistant from the central member 15 when the arms are fully extended. The wings are swingably mounted on the arms so that they are free to move from a position below a horizontal plane through the arms to a position above such plane as shown in Figure 4. The wings may be swingably supported in the arms in any suitable manner such as by providing the wings with holes 29 and 30 which loosely engage U-shaped portions 20 formed in the arms 11 and 12.

As the spreader is lowered in the water by the weight of the sinker, each wing is deflected so that it is above the horizontal plane through the arms 11 and 12 as shown in Figure 4. This upward deflection of the wings causes an angular surface to be presented to the pressure of the water resulting in rotation of the sweep around the vertical connecting wire 21 extending through the central member 15. Conversely, when the spreader is being raised in the water, the wings are deflected to a point below the horizontal plane through the arms of the spreader 11 and 12 and rotation continues in the same direction.

The degree of angularity of the wings above and below the horizontal plane through the arms of the spreader is dependent upon the means employed for attaching the wings to the arms. By changing the distance through which the wings may be deflected, the speed at which the sweep rotates may be varied.

The direction of rotation may be changed by simply reversing the points at which the line and the sinker are attached to the spreader. For example, as shown in Figure 1, the sinker 24 may be attached to the snap 22 while the line-holding pivot 23 can be attached to snap 25.

In some cases, if the pivot means connecting the line to the spreader is not functioning properly, the line may become twisted by the rotation of the sweep. However, this twist can be eliminated by reversing the direction of rotation as described above. In addition, possible twisting of the line may be reduced by using a relatively flat sinker, that is, one presenting a relatively large surface area, to resist turning as the sweep rotates when the sinker is suspended edgewise in the water.

To further resist the tendency of the line to twist as the sweep rotates, it is preferable to use a braided line.

As shown in Figure 3, the sweep may be constructed of a single length of wire or rod. For example, a wire 36 may be bent to provide a figure eight as the central member 37 with arms extending in opposite directions. To these arms, wings 31 and 32 may be attached as described above. Also, a pivot means 38 may be attached to the central member 37 with clip 35. Loops 33 and 34 may be provided at the ends of the sweep for attachment of suitable lures or hooks.

The size and shape of the wings is not critical, however, it should be realized that the size and shape will affect the speed of rotation. In addition, the size and shape will contribute to the general appearance of the spreader in the water and, to some extent, its attractiveness to fish.

As shown in the detailed description above, the new and improved spreaders of the present invention achieve continuous rotation of lures in one direction irrespective of whether the spreader is being raised or lowered in the water. This continuous rotation is particularly suitable when weakened or dead minnows or other natural bait is being used since the rotation imparts a life-like swimming action to the bait. This assures that a minnow will move in a manner simulating live swimming even though it is no longer living. Moreover, the construction of the spreader of the invention permits changing the direction of continuous rotation by simply reversing the attachment of the line and the sinker to the spreader. Furthermore, these achievements are accomplished by a construction which is simple in design and of relatively low cost to manufacture.

From the above description, it will be apparent to one skilled in the art that various modifications may be made in the spreaders described without departing from the scope of the invention. Therefore, the invention is to be limited only by the following claims.

What is claimed is:

1. A rotatable spreader for use in fishing comprising a substantially straight support having a central vertical pivot means for line attachment, a sinker and at least a pair of lure supporting means spaced from said central pivot means, wings having major portions mounted on said support on opposite sides of said pivot means and on opposite sides of the support as viewed in a vertical direction, said major portions of said wings being mounted so that they can swing upwardly to form an acute angle with a horizontal plane to cause rotation of said support in one direction as it is being lowered in the water, and said major portions of said wings being mounted so that they can swing downwardly to form an acute angle to a horizontal plane as the spreader is being raised in the water to continue rotation in the same direction.

2. A rotatable spreader for use in fishing comprising a collapsible, substantially straight support having a central vertical pivot means for line attachment, a sinker and at least a pair of lure supporting means spaced from said central pivot means, wings having major portions mounted on said support on opposite sides of said pivot means and on opposite sides of the support as viewed in a vertical direction, and mounted substantially equidistant from said central pivot means said major portions of said wings being mounted so that they can swing upwardly to form an acute angle with a horizontal plane to cause rotation of said support in one direction as it is being lowered in the water, and said major portions of said wings being mounted so that they can swing downwardly to form an acute angle to a horizontal plane as the spreader is being raised in the water to continue rotation in the same direction.

3. A rotatable spreader for use in fishing comprising a substantially straight support having a central vertical pivot means for line attachment, a sinker and at least a pair of lure supporting means spaced from said central pivot means, wings having major portions mounted on said support on opposite sides of said pivot means and on opposite sides of the support as viewed in a vertical direction, and mounted substantially equidistant from said central pivot means, said major portions of said wings being mounted so that they can swing upwardly to form an acute angle with a horizontal plane to cause rotation of said support in one direction as it is being lowered in the water, and said major portions of said wings being mounted so that they can swing downwardly to form an acute angle to a horizontal plane as the spreader is being raised in the water to continue rotation in the same direction.

4. A rotatable spreader for use in fishing comprising a substantially straight support having a central vertical pivot means for line attachment, a sinker and at least a pair of lure supporting means spaced from said central pivot means, wings having major portions mounted on said support on opposite sides of said pivot means and on opposite sides of the support as viewed in a vertical direction, and mounted substantially equidistant from said central pivot means said major portions of said wings being mounted so that they can swing upwardly to form an acute angle with a horizontal plane to cause rotation of said support in one direction as it is being lowered in the water, and said major portions of said wings being mounted so that they can swing downwardly to form an acute angle to a horizontal plane as the spreader is being raised in the water to continue rotation in the same direction; and said sinker having a relatively large surface area in one plane.

5. A rotatable spreader for use in fishing comprising a substantially straight support comprising a pair of arms, a central vertical pivot means for line attachment, a sinker and at least a pair of lure supporting means spaced from said central pivot means, wings having major portions mounted on said support on opposite sides of said pivot means and on opposite sides of the support as viewed in a vertical direction, and mounted substantially equidistant from said central pivot means; said wings being provided with holes which loosely engage portions of said support to permit relative movement of the wings transversely of the arms of the support said major portions of said wings being mounted so that they can swing upwardly to form an acute angle with a horizontal plane to cause rotation of said support in one direction as it is being lowered in the water, and said major portions of said wings being mounted so that they can swing downwardly to form an acute angle to a horizontal plane as the spreader is being raised in the water to continue rotation in the same direction.

References Cited in the file of this patent

UNITED STATES PATENTS

| | | |
|---|---|---|
| 1,918,747 | Hammarstrom | July 18, 1933 |
| 2,223,922 | Schofield | Dec. 3, 1940 |
| 2,708,804 | Kucklick | May 24, 1955 |
| 2,733,536 | Terazono | Feb. 7, 1956 |